US010309676B2

(12) United States Patent
Kimura et al.

(10) Patent No.: US 10,309,676 B2
(45) Date of Patent: Jun. 4, 2019

(54) AIR-SOURCE HEAT PUMP AIR CONDITIONER

(71) Applicant: KIMURA KOHKI CO., LTD., Osaka-shi, Osaka (JP)

(72) Inventors: Keiichi Kimura, Yao (JP); Takayuki Ishida, Yao (JP); Kazuya Goto, Yao (JP)

(73) Assignee: KIMURA KOHKI CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/947,663

(22) Filed: Apr. 6, 2018

(65) Prior Publication Data
US 2018/0313562 A1 Nov. 1, 2018

(30) Foreign Application Priority Data

Apr. 26, 2017 (JP) .................... 2017-87450

(51) Int. Cl.
*F24F 1/0003* (2019.01)
*F24F 1/0035* (2019.01)
(Continued)

(52) U.S. Cl.
CPC ............ *F24F 11/46* (2018.01); *F24F 1/0003* (2013.01); *F24F 1/0035* (2019.02); *F24F 3/001* (2013.01);
(Continued)

(58) Field of Classification Search
CPC .... F24F 1/14; F24F 13/04; F24F 11/83; F24F 1/0035; F24F 3/044; F24F 11/81; F25B 2400/06
See application file for complete search history.

(56) References Cited

U.S. PATENT DOCUMENTS

| 2,071,178 A | 2/1937 | Roessler |
| 4,266,599 A | 5/1981 | Saunders et al. |

(Continued)

FOREIGN PATENT DOCUMENTS

| JP | 2004340529 A | 12/2004 |
| JP | 2006145070 A | 6/2006 |

(Continued)

*Primary Examiner* — Cassey D Bauer
(74) *Attorney, Agent, or Firm* — Alleman Hall Creasman & Tuttle LLP (57) ABSTRACT

An air-source heat pump air conditioner includes a first heat pump including a first refrigeration cycle that is formed by a first air-conditioning heat exchanger, a first heat-source heat exchanger, a first compressor, and first refrigerant flowing therethrough; a second heat pump including a second refrigeration cycle that is formed by a second air-conditioning heat exchanger, a second heat-source heat exchanger, a second compressor, and second refrigerant flowing therethrough; and an air conditioner control device configured to control the first heat pump and the second heat pump to operate at least one of the first refrigeration cycle and the second refrigeration cycle for a space to be air conditioned, the air-conditioning air containing outside air, return air, and other air that exchange heat with the first circulating refrigerant and the second circulating refrigerant in the first air-conditioning heat exchanger and the second air-conditioning heat exchanger.

7 Claims, 3 Drawing Sheets

(51) Int. Cl.

| | | |
|---|---|---|
| *F24F 13/04* | (2006.01) | |
| *F24F 3/00* | (2006.01) | |
| *F24F 3/14* | (2006.01) | |
| *F24F 5/00* | (2006.01) | |
| *F24F 11/46* | (2018.01) | |
| *F24F 11/81* | (2018.01) | |
| *F24F 11/83* | (2018.01) | |
| *F24F 3/044* | (2006.01) | |

(52) U.S. Cl.
CPC ............... *F24F 3/044* (2013.01); *F24F 3/14* (2013.01); *F24F 5/001* (2013.01); *F24F 11/81* (2018.01); *F24F 11/83* (2018.01); *F24F 13/04* (2013.01); *F24F 2003/0446* (2013.01); *F25B 2400/06* (2013.01)

(56) References Cited

U.S. PATENT DOCUMENTS

| | | |
|---|---|---|
| 2016/0025384 A1 | 1/2016 | Kimura et al. |
| 2016/0116177 A1* | 4/2016 | Sikora .................... F24F 11/30 165/11.2 |

FOREIGN PATENT DOCUMENTS

| | | |
|---|---|---|
| JP | 2013053836 A | 3/2013 |
| JP | 201631168 A | 3/2016 |
| JP | 2017072357 A | 4/2017 |

* cited by examiner

AIR-SOURCE HEAT PUMP AIR CONDITIONER

CROSS REFERENCE TO RELATED APPLICATION

This application claims priority to and the benefit of Japanese Patent Application No. 2017-087450, filed Apr. 26, 2017, the entire disclosure of which is incorporated herein by reference.

BACKGROUND OF THE INVENTION

1. Field of the Invention

The present invention relates to an air-source heat pump air conditioner.

2. Description of the Related Art

In a case where the gross floor area of a building is a predetermined area or more, each room of the building is required to take in outside air, such that the carbon dioxide concentration in the room is reduced to a reference value or lower. For example, Japanese Laid-Open Patent Application Publication No. 2004-340529 proposes an energy-saving air conditioning system that makes it possible to meet such requirement.

The energy-saving air conditioning system disclosed in Japanese Laid-Open Patent Application Publication No. 2004-340529 is configured to: cause outside air and return air, both of which serve as air-conditioning air, to undergo heat exchange in two respective heat exchangers separately, such that each of the outside air and the return air exchanges heat with a circulating refrigerant; then mix the outside air and the return air together; and supply the mixed air to a space to be air conditioned, thereby cooling or heating the space. In the case of performing cooling by the energy-saving air conditioning system, low-temperature outside air that has been cooled and dehumidified is mixed with return air that has been subjected to sensible heat cooling, and thereby a temperature and humidity controlling effect is obtained, which is the same effect as that obtained in reheat control using cold water and hot water. Thus, there are advantages in terms of energy saving and cost saving.

However, the above energy-saving air conditioning system disclosed in Japanese Laid-Open Patent Application Publication No. 2004-340529 has the following technical problems. In a case where two air-conditioning outdoor units are connected to the two respective heat exchangers and thereby two refrigeration cycles are formed, the operating time of one outdoor unit and the operating time of the other outdoor unit are not equal to each other, which results in high life-cycle cost.

SUMMARY OF THE INVENTION

The present invention has been made to solve the above-described problems. An object of the present invention is to provide an air-source heat pump air conditioner that makes it possible to reduce the life-cycle cost and energy consumption.

An air-source heat pump air conditioner according to one aspect of the present invention includes: a first heat pump including a first refrigeration cycle that is formed by a first air-conditioning heat exchanger, a first heat-source heat exchanger, a first compressor, and a first circulating refrigerant flowing between and through the first air-conditioning heat exchanger, the first heat-source heat exchanger, and the first compressor; a second heat pump including a second refrigeration cycle that is formed by a second air-conditioning heat exchanger, a second heat-source heat exchanger, a second compressor, and a second circulating refrigerant flowing between and through the second air-conditioning heat exchanger, the second heat-source heat exchanger, and the second compressor; and an air conditioner control device configured to control the first heat pump and the second heat pump to operate at least one of the first refrigeration cycle and the second refrigeration cycle to adjust air-conditioning air to be in a suitable air condition for air conditioning of a space to be air conditioned, the air-conditioning air containing outside air, return air, and other air that exchange heat with the first circulating refrigerant and the second circulating refrigerant in the first air-conditioning heat exchanger and the second air-conditioning heat exchanger.

Owing to the above configuration, the air-source heat pump air conditioner according to the one aspect of the present invention has the advantage of making it possible to reduce the life-cycle cost and energy consumption.

The above and further objects, features, and advantages of the present invention will more fully be apparent from the following detailed description of preferred embodiments with accompanying drawings.

DESCRIPTION OF THE PREFERRED EMBODIMENTS

Hereinafter, specific aspects of the present invention are described.

An air-source heat pump air conditioner according to a first aspect of the present invention includes: a first heat pump including a first refrigeration cycle that is formed by a first air-conditioning heat exchanger, a first heat-source heat exchanger, a first compressor, and a first circulating refrigerant flowing between and through the first air-conditioning heat exchanger, the first heat-source heat exchanger, and the first compressor; a second heat pump including a second refrigeration cycle that is formed by a second air-conditioning heat exchanger, a second heat-source heat exchanger, a second compressor, and a second circulating refrigerant flowing between and through the second air-conditioning heat exchanger, the second heat-source heat exchanger, and the second compressor; and an air conditioner control device configured to control the first heat pump and the second heat pump to operate at least one of the first refrigeration cycle and the second refrigeration cycle to adjust air-conditioning air to be in a suitable air condition for air conditioning of a space to be air conditioned, the air-conditioning air containing outside air, return air, and other air that exchange heat with the first circulating refrigerant and the second circulating refrigerant in the first air-conditioning heat exchanger and the second air-conditioning heat exchanger.

According to the above configuration, since the air-source heat pump air conditioner according to the first aspect of the present invention includes the air conditioner control device, the first heat pump and the second heat pump can be controlled to operate at least one of the first refrigeration cycle and the second refrigeration cycle to adjust the air-conditioning air containing the outside air, the return air, and the other air to be in the suitable air condition for the air conditioning of the space to be air conditioned.

Accordingly, one of or both the first refrigeration cycle and the second refrigeration cycle can be operated as necessary, and thereby the proportion of the operating time of the first heat pump and the proportion of the operating time of the second heat pump can be adjusted. This makes it possible to level out the operating time of the first heat pump and the second heat pump, thereby reducing the life-cycle cost. Since it is not necessary to always operate both the first refrigeration cycle and the second refrigeration cycle, the energy consumption can be reduced.

Thus, the air-source heat pump air conditioner according to the first aspect of the present invention has an advantage of making it possible to reduce the life-cycle cost and energy consumption.

An air-source heat pump air conditioner according to a second aspect of the present invention may be configured such that, in the above first aspect, the air conditioner control device includes a switching controller, and in a case where the air-conditioning air is adjustable to be in the suitable air condition by operating one of the first refrigeration cycle and the second refrigeration cycle, the switching controller may: control the first heat pump such that the outside air and the first circulating refrigerant exchange heat with each other in the first refrigeration cycle if a load of the outside air is greater than a preset load; and control the second heat pump such that the return air and the second circulating refrigerant exchange heat with each other in the second refrigeration cycle if the load of the outside air is less than the preset load.

According to the above configuration, in a case where the air-conditioning air is adjustable to be in the suitable air condition by operating one of the first heat pump and the second heat pump, the proportion of the operating time of the first heat pump and the proportion of the operating time of the second heat pump can be freely adjusted depending on whether the load of the outside air is greater than the preset load or less than the preset load.

Accordingly, the operating time of the first heat pump and the second heat pump can be leveled out, and the life-cycle cost can be reduced. In the above-described configuration, if the load of the outside air is greater than the preset load, the outside air and the first circulating refrigerant are caused to exchange heat with each other in the first refrigeration cycle, and if the load of the outside air is less than the preset load, the return air and the second circulating refrigerant are caused to exchange heat with each other in the second refrigeration cycle. Thus, it is not necessary to always operate both the first refrigeration cycle and the second refrigeration cycle. This makes is possible to reduce energy consumption.

An air-source heat pump air conditioner according to a third aspect of the present invention may be configured such that the air-source heat pump air conditioner of the above first aspect includes an air volume adjusting device configured to adjust an air volume of the outside air that exchanges heat with the first circulating refrigerant in the first air-conditioning heat exchanger and an air volume of the return air that exchanges heat with the second circulating refrigerant in the second air-conditioning heat exchanger. In the third aspect, the air conditioner control device may include a defrosting controller, and in a case where the air-conditioning air is adjustable to be in the suitable air condition by operating both the first refrigeration cycle and the second refrigeration cycle, the defrosting controller may: control the air volume adjusting device to increase the air volume of the return air and decrease the air volume of the outside air when the first heat pump has started a defrosting operation; and control the air volume adjusting device to decrease the air volume of the return air and increase the air volume of the outside air when the second heat pump has started a defrosting operation.

According to the above configuration, the air-source heat pump air conditioner decreases the air volume of the supply air from the air-conditioning heat exchanger whose heating performance has dropped due to its defrosting operation, and increases the air volume of the supply air from the air-conditioning heat exchanger whose heating performance is at a normal level. In this manner, decrease in the supply air temperature can be suppressed. This makes it possible to maintain the comfortableness of the space to be air conditioned even in a geographical region where a defrosting operation is frequently performed.

An air-source heat pump air conditioner according to a fourth aspect of the present invention may be configured such that the air-source heat pump air conditioner of the above first or second aspect includes an air volume adjusting device configured to adjust an air volume of the outside air that exchanges heat with the first circulating refrigerant in the first air-conditioning heat exchanger and an air volume of the return air that exchanges heat with the second circulating refrigerant in the second air-conditioning heat exchanger. In the fourth aspect, the air conditioner control device may include an air conditioning performance compensator configured to: control the air volume adjusting device to increase the air volume of the return air and decrease the air volume of the outside air in a case where an enthalpy of the outside air is greater than an enthalpy of the return air; and control the air volume adjusting device to decrease the air volume of the return air and increase the air volume of the outside air in a case where the enthalpy of the outside air is less than the enthalpy of the return air.

According to the above configuration, the air-source heat pump air conditioner decreases the air volume of the air-conditioning air that has a greater enthalpy and increases the air volume of the air-conditioning air that has a less enthalpy. This makes it possible to reduce an unnecessary air-conditioning load, thereby realizing reduction of energy consumption.

An air-source heat pump air conditioner according to a fifth aspect of the present invention may be configured such that, in any one of the above first to fourth aspects, the first heat pump includes two sets of the first heat-source heat exchanger and the first compressor. In the fifth aspect, the first refrigeration cycle may include: a third refrigeration cycle that is formed by a first set of the first heat-source heat exchanger and the first compressor, the first air-conditioning heat exchanger, and a third circulating refrigerant flowing between and through the first set of the first heat-source heat exchanger and the first compressor and the first air-conditioning heat exchanger; and a fourth refrigeration cycle that is formed by a second set of the first heat-source heat exchanger and the first compressor, the first air-conditioning heat exchanger, and a fourth circulating refrigerant flowing between and through the second set of the first heat-source heat exchanger and the first compressor and the first air-conditioning heat exchanger. In the fifth aspect, the air conditioner control device may include a first air conditioning performance controller configured to control the first heat pump in accordance with variation in a load of the outside air to switch an operation state of the first heat pump between a state where one of the third refrigeration cycle and the fourth refrigeration cycle is operated and a state where both the third refrigeration cycle and the fourth refrigeration cycle are operated.

An air-source heat pump air conditioner according to a sixth aspect of the present invention may be configured such that, in any one of the above first to fifth aspects, the second heat pump includes two sets of the second heat-source heat exchanger and the second compressor. In the sixth aspect, the second refrigeration cycle may include: a fifth refrigeration cycle that is formed by a first set of the second heat-source heat exchanger and the second compressor, the second air-conditioning heat exchanger, and a fifth circulating refrigerant flowing between and through the first set of the second heat-source heat exchanger and the second compressor and the second air-conditioning heat exchanger; and a sixth refrigeration cycle that is formed by a second set of the second heat-source heat exchanger and the second compressor, the second air-conditioning heat exchanger, and a sixth circulating refrigerant flowing between and through the second set of the second heat-source heat exchanger and the second compressor and the second air-conditioning heat exchanger. In the sixth aspect, the air conditioner control device may include a second air conditioning performance controller configured to control the second heat pump in accordance with variation in a load of the outside air to switch an operation state of the second heat pump between a state where one of the fifth refrigeration cycle and the sixth refrigeration cycle is operated and a state where both the fifth refrigeration cycle and the sixth refrigeration cycle are operated.

According to the above configurations, the refrigeration cycle (the first refrigeration cycle or the second refrigeration cycle) included in a single heat pump (the first heat pump or the second heat pump) is divided into two refrigeration cycles (the third refrigeration cycle and the fourth refrigeration cycle, or the fifth refrigeration cycle and the sixth refrigeration cycle).

This configuration makes it possible to lower the minimum critical power of the compressor in each refrigeration cycle. Therefore, fine supply air temperature control with no excess or deficiency in the cooling and heating performance can be performed even in a low-load period, such as an intermediate seasonal period. This makes it possible to suppress variation in the temperature of the space to be air conditioned and suppress wasteful energy consumption of the compressors. Consequently, both the comfortableness and energy-saving performance can be improved.

It should be noted that, for each compressor included in the air-source heat pump air conditioner, a minimum required output is preset so that the refrigeration cycle processes can be performed properly. This minimum required output is the minimum critical power. The higher the performance of the compressor, the higher is the minimum critical power thereof.

In the air-source heat pump air conditioner according to the sixth aspect of the present invention, one heat pump includes two refrigeration cycles. For this reason, the performance of the compressor provided in each of these refrigeration cycles is allowed to be lower than the performance of the compressor included in a heat pump that includes only one refrigeration cycle. Therefore, the air-source heat pump air conditioner according to the sixth aspect of the present invention makes it possible to lower the minimum critical power of the compressor in each refrigeration cycle.

Moreover, since the two refrigeration cycles share one air-conditioning heat exchanger, in a case where a normal cooling/heating operation is performed by one of the refrigeration cycles and a defrosting operation is performed by the other refrigeration cycle, the air-conditioning heat exchanger can utilize the thermal energy of the one refrigeration cycle for the defrosting operation of the other refrigeration cycle. This makes it possible to reduce the defrosting time.

An air-source heat pump air conditioner according to a seventh aspect of the present invention may be configured such that, in any one of the above first to sixth aspects, the air conditioner control device includes an outside air cooling controller configured to cool the space to be air conditioned by the outside air in a case where a temperature of the outside air is lower than a temperature of the space to be air conditioned.

The above configuration includes the outside air cooling controller. Accordingly, in a case where the temperature of the outside air is low, for example, in a winter period, if it is necessary to cool the space to be air conditioned since the temperature of the space to be air conditioned is high, the air-conditioning operation can be switched to outside air cooling. Therefore, the air-source heat pump air conditioner makes it possible to improve the comfortableness of the space to be air conditioned, and at the same time, reduce the energy consumption.

An air-source heat pump air conditioner according to an eighth aspect of the present invention may be configured such that the air-source heat pump air conditioner of any one of the above first to seventh aspects includes a humidifier configured to humidify the air-conditioning air at a downwind side of one of or both the first air-conditioning heat exchanger and the second air-conditioning heat exchanger. In the eighth aspect, the humidifier may be configured as a vaporizing humidifier that humidifies the air-conditioning air by evaporation of water, or configured as a steam humidifier that humidifies the air-conditioning air with steam.

According to the above configuration, in a case where the humidifier is configured as a vaporizing humidifier, evaporative cooling can be utilized, which allows the air-source heat pump air conditioner to reduce energy consumption at the time of performing cooling. In a case where the humidifier is configured as a steam humidifier or as two vaporizing humidifiers, even when the air-source heat pump air conditioner performs, for example, outside air cooling utilizing low-temperature air-conditioning air, insufficient humidification will not occur, and thus a comfortable environment can be realized.

(Embodiment 1)

Figure 1:
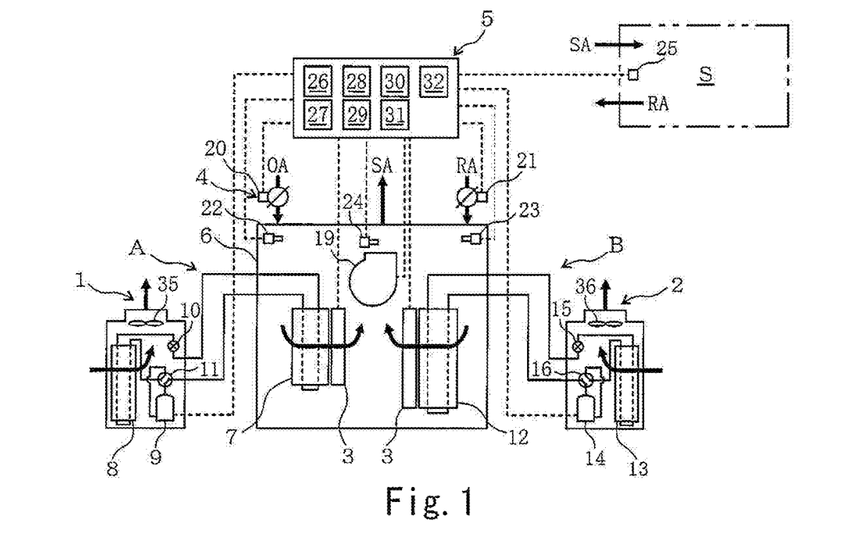
FIG. 1 shows one example of a schematic configuration of an air-source heat pump air conditioner according to Embodiment 1 of the present invention.
Figure 2:
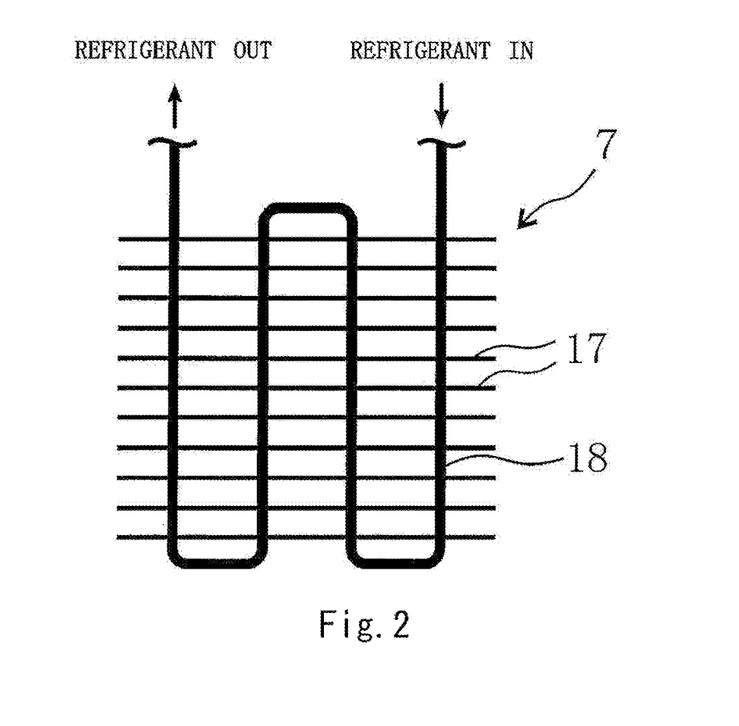
FIG. 2 shows one example of a schematic configuration of a first air-conditioning heat exchanger according to Embodiment 1 of the present invention.

Hereinafter, the configuration of an air-source heat pump air conditioner according to Embodiment 1 of the present invention is described with reference to FIG. 1 and FIG. 2. FIG. 1 is a schematic diagram showing one example of the configuration of the air-source heat pump air conditioner according to Embodiment 1 of the present invention. FIG. 2 shows one example of a schematic configuration of a first air-conditioning heat exchanger 7 according to Embodiment 1 of the present invention. As shown in FIG. 1, the air-source heat pump air conditioner includes: a first heat pump 1; a second heat pump 2; humidifiers 3; an air volume adjusting device 4; an air conditioner control device 5; and a casing 6. The air inlet and outlet of the air-source heat pump air conditioner are connected to a space S to be air conditioned, such as a room or a hall in a building, and the outdoors by ducts that are not shown. Outside air (OA) serving as air-conditioning air is fed from the outdoors, and return air (RA) serving as air-conditioning air is fed from the space S to be air conditioned, to the air-source heat pump air conditioner. Supply air (SA) serving as air-conditioning air is supplied from the air-source heat pump air conditioner to the space S to be air conditioned. In the drawings, each solid bold arrow indicates the direction of an air flow.

The first heat pump 1 sequentially performs compression, condensation, expansion, and evaporation processes on a circulating refrigerant repeatedly. In the evaporation process, heat is absorbed from air that exchanges heat with the circulating refrigerant. In the condensation process, heat is released to air that exchanges heat with the circulating refrigerant. Specifically, the first heat pump 1 includes at least: the first air-conditioning heat exchanger 7 and a first heat-source heat exchanger 8 each configured to perform the evaporation process and the condensation process of the circulating refrigerant, such that the first air-conditioning heat exchanger 7 and the first heat-source heat exchanger 8 perform different processes from each other; a first compressor 9 configured to compress and convey the circulating refrigerant; a pressure reduction mechanism 10, such as an expansion valve, configured to expand the circulating refrigerant; and a switching mechanism 11, such as a valve, configured to switch a process to perform between the evaporation process and the condensation process for each of the first air-conditioning heat exchanger 7 and the first heat-source heat exchanger 8. The first heat pump 1 includes a first refrigeration cycle A, which is formed by connecting these devices by piping, such that the circulating refrigerant (a first circulating refrigerant) flows between and through these devices in a circulating manner.

The second heat pump 2 sequentially performs compression, condensation, expansion, and evaporation processes on a circulating refrigerant repeatedly. In the evaporation process, heat is absorbed from air that exchanges heat with the circulating refrigerant. In the condensation process, heat is released to air that exchanges heat with the circulating refrigerant. Specifically, the second heat pump 2 includes at least: a second air-conditioning heat exchanger 12 and a second heat-source heat exchanger 13 each configured to perform the evaporation process and the condensation process of the circulating refrigerant, such that the second air-conditioning heat exchanger 12 and the second heat-source heat exchanger 13 perform different processes from each other; a second compressor 14 configured to compress and convey the circulating refrigerant; a pressure reduction mechanism 15, such as an expansion valve, configured to expand the circulating refrigerant; and a switching mechanism 16, such as a valve, configured to switch a process to perform between the evaporation process and the condensation process for each of the second air-conditioning heat exchanger 12 and the second heat-source heat exchanger 13. The second heat pump 2 includes a second refrigeration cycle B, which is formed by connecting these devices by piping, such that the circulating refrigerant (a second circulating refrigerant) flows between and through these devices in a circulating manner.

In the example shown in FIG. 1, each of the first heat pump 1 and the second heat pump 2 is configured as a so-called separate type heat pump, which is divided into an outdoor unit side and an indoor unit side. Fans 35 and 36 are provided at the outdoor unit side, and the fans 35 and 36 feed outside air to the first heat-source heat exchanger 8 and the second heat-source heat exchanger 13, respectively, to perform heat exchange with the circulating refrigerants (the first circulating refrigerant and the second circulating refrigerant).

As shown in FIG. 2, similar to a general plate fin coil, the first air-conditioning heat exchanger 7 is formed by attaching a group of heat transfer pipes 18 to a group of heat transfer plates 17 by insertion. The circulating refrigerant is flowed through the inside of the heat transfer pipes 18, and the air-conditioning air is brought into contact with the heat transfer pipes 18 and the heat transfer plates 17. As a result, the air-conditioning air and the circulating refrigerant exchange heat with each other, and thereby the air-conditioning air is cooled or heated. It should be noted that the first heat-source heat exchanger 8, the second air-conditioning heat exchanger 12, and the second heat-source heat exchanger 13 can also be configured in the same manner as the first air-conditioning heat exchanger 7.

The humidifier 3 is provided downwind of one of or both (in FIG. 1, both) the first air-conditioning heat exchanger 7 and the second air-conditioning heat exchanger 12, and humidifies the air-conditioning air. Each humidifier 3 can be configured as a vaporizing humidifier that humidifies the air-conditioning air by evaporation of water.

The air volume adjusting device 4 includes: an air blower 19 configured to adjust the air volume of the supply air to the space S to be air conditioned; a first damper 20 configured to adjust the air volume of the outside air that exchanges heat with the first circulating refrigerant in the first air-conditioning heat exchanger 7; a second damper 21 configured to adjust the air volume of the return air that exchanges heat with the second circulating refrigerant in the second air-conditioning heat exchanger 12. In the example shown in FIG. 1, the outside air is, after being passed through the first damper 20, the first air-conditioning heat exchanger 7, and the humidifier 3, supplied by the air blower 19 to the space S to be air conditioned. Also, the return air is, after being passed through the second damper 21, the second air-conditioning heat exchanger 12, and the humidifier 3, supplied by the air blower 19 to the space S to be air conditioned.

It should be noted that, in the example shown in FIG. 1, the air-source heat pump air conditioner is configured such that the first air-conditioning heat exchanger 7, the second air-conditioning heat exchanger 12, the humidifiers 3, and the air blower 19 are provided in the casing 6. However, the configuration of the air-source heat pump air conditioner is not limited to this example. Alternatively, the air-source heat pump air conditioner may be configured such that the air conditioner control device 5, the first damper 20, and the second damper 21 are also provided in the casing 6. Further alternatively, the air-source heat pump air conditioner may be configured such that the outdoor-unit-side components of each of the first heat pump 1 and the second heat pump 2 are also provided in the casing 6, and from these outdoor-unit-side components, the outside air may be fed to each of the first heat-source heat exchanger 8 and the second heat-source heat exchanger 13 through a duct.

The air conditioner control device 5 controls the first heat pump 1 and the second heat pump 2 to adjust the air-conditioning air to be in suitable air conditions for the air conditioning of the space S to be air conditioned, the air-conditioning air containing the outside air, the return air, and other air that exchange heat with the circulating refrigerants (the first circulating refrigerant and the second circulating refrigerant) in the first air-conditioning heat exchanger 7 and the second air-conditioning heat exchanger 12. The air conditioner control device 5 includes: an outside air sensor 22 configured to detect the temperature and humidity of the outside air; a return air sensor 23 configured to detect the temperature and humidity of the return air; a supply air sensor 24 configured to detect the temperature and humidity of the supply air; a carbon dioxide concentration sensor 25 configured to detect the carbon dioxide concentration in the space S to be air conditioned; a switching controller 26; a defrosting controller 27; an air conditioning performance compensator 28; a carbon dioxide concentration controller 29; a vaporization cooling controller 30; an outside air cooling controller 31; and a load setter 32. The air conditioner control device 5 can be formed by a microprocessor, various sensors, and other control devices.

In a case where the air-conditioning air is adjustable to be in the aforementioned suitable air conditions by operating one of the first heat pump 1 and the second heat pump 2 (e.g., in an intermediate seasonal period in which the air-conditioning load is low), if the load of the outside air is greater than a preset load, the switching controller 26 controls the first heat pump such that the outside air and the first circulating refrigerant exchange heat with each other in the first refrigeration cycle A. On the other hand, if the load of the outside air is less than the preset load, the switching controller 26 controls the second heat pump such that the return air and the second circulating refrigerant exchange heat with each other in the second refrigeration cycle B. It should be noted that "the load of the outside air" means the amount of heat that is removed from or added to the outside air to adjust the air in the space S to be air conditioned to be in the suitable air conditions. The preset load can be set by the load setter 32. The switching controller 26 is capable of comparing the load of the outside air and the preset load by using information such as temperature, humidity, enthalpy, and other load information. For example, at the time of performing cooling, the comparison of the preset load and the load of the outside air can be performed by using the dew point temperature of the outside air. On the other hand, at the time of performing heating, the comparison of the preset load and the load of the outside air can be performed by using a target dry-bulb temperature to which the temperature of the space S to be air conditioned is adjusted.

In a case where the air-conditioning air is adjustable to be in the suitable air conditions by operating both the first heat pump 1 and the second heat pump 2 (e.g., in a case where the air-conditioning load is at its peak), when the first heat pump 1 has started a defrosting operation, the defrosting controller 27 controls the air volume adjusting device 4 to increase the air volume of the return air and decrease the air volume of the outside air. On the other hand, when the second heat pump 2 has started a defrosting operation, the defrosting controller 27 controls the air volume adjusting device 4 to decrease the air volume of the return air and increase the air volume of the outside air. It should be noted that examples of the defrosting operation to be performed include off-cycle defrosting, hot-gas defrosting, and other types of defrosting.

In a case where the enthalpy of the outside air is greater than the enthalpy of the return air, the air conditioning performance compensator 28 controls the air volume adjusting device 4 to increase the air volume of the return air and decrease the air volume of the outside air. On the other hand, in a case where the enthalpy of the outside air is less than the enthalpy of the return air, the air conditioning performance compensator 28 controls the air volume adjusting device 4 to decrease the air volume of the return air and increase the air volume of the outside air. Thus, the air-source heat pump air conditioner is capable of decreasing the air volume of the air-conditioning air that has a greater enthalpy and increasing the air volume of the air-conditioning air that has a less enthalpy. This makes it possible to reduce an unnecessary air-conditioning load, thereby realizing energy saving. It should be noted that the enthalpies are calculated based on the temperature and humidity detected by the outside air sensor 22 and the temperature and humidity detected by the return air sensor 23.

The carbon dioxide concentration controller 29 controls one of or both the first damper 20 and the second damper 21 of the air volume adjusting device 4 to adjust the air volume of the outside air, such that the carbon dioxide concentration in the space S to be air conditioned, which is detected by the carbon dioxide concentration sensor 25, is in a preset range. In the example shown in FIG. 1, the first damper 20 adjusts the air volume of the outside air, and the second damper 21 adjusts the air volume of the return air.

In a case where one of or both the humidity of the outside air and the humidity of the return air is/are lower than a preset humidity of the space S to be air conditioned, the vaporization cooling controller 30 controls the humidifier(s) 3 to cool one of or both the outside air and the return air by evaporation. As one example, when the air-source heat pump air conditioner performs a cooling operation, the humidifier(s) 3 is/are controlled to perform evaporative cooling that uses no motive power. This makes it possible to reduce cooling energy consumed by the first heat pump 1 and the second heat pump 2, thereby realizing energy saving. It should be noted that the humidity of the space S to be air conditioned is detected by the return air sensor 23, and the humidity of the outside air is detected by the outside air sensor 22.

In a case where the temperature of the outside air serving as air-conditioning air is lower than the temperature of the space S to be air conditioned, the outside air cooling controller 31 stops one of or both the first compressor 9 of the first heat pump 1 and the second compressor 14 of the second heat pump 2, and controls the air volume adjusting device 4 to cool the space S to be air conditioned by the outside air. In this case, the air-source heat pump air conditioner may be configured to cool the space S to be air conditioned by the outside air while also utilizing evaporative cooling by the humidifier(s) 3 at the downwind side of one of or both the first air-conditioning heat exchanger 7 and the second air-conditioning heat exchanger 12. This configuration makes it possible to realize energy saving.

In a case where a cooling operation requiring dehumidification is performed to cool the space S to be air conditioned in a summer period, the air conditioner control device 5 causes the outside air that has been cooled and dehumidified by the first air-conditioning heat exchanger 7 to be mixed with the return air that has been cooled (but not dehumidified) by the second air-conditioning heat exchanger 12, thereby controlling the temperature and humidity of the supply air to be a target supply air temperature and target supply air humidity. In this manner, the space S to be air conditioned can be air conditioned to a preset temperature and preset humidity. In a case where a cooling operation that does not require dehumidification of the outside air is performed to cool the space S to be air conditioned, the air conditioner control device 5 may also utilize evaporative cooling by the humidifiers 3 in the cooling operation.

In a case where a heating operation is performed to heat the space S to be air conditioned in a winter period, the air conditioner control device 5 causes the humidifiers 3 to humidify, as necessary, the outside air that has been heated by the first air-conditioning heat exchanger 7 and the return air that has been heated by the second air-conditioning heat exchanger 12, and causes the outside air and the return air to be mixed together, thereby controlling the temperature and humidity of the supply air to be a target supply air temperature and target supply air humidity. On the other hand, in a case where a cooling operation is performed in a winter period, outside air cooling is performed in the following manner. Specifically, the outside air whose temperature is lower than the temperature of the space S to be air conditioned is directly supplied to the space S to be air conditioned without being heated by the first air-conditioning heat exchanger 7. Alternatively, the outside air whose temperature is lower than the temperature of the space S to be air conditioned is heated by the first air-conditioning heat exchanger 7 to a suitable temperature for the cooling, and then supplied to the space S to be air conditioned. Meanwhile, the return air is directly supplied to the space S to be air conditioned without being heated by the second air-conditioning heat exchanger 12. At the time, the return air may be humidified by the humidifier 3 as necessary. By humidifying the return air having a high temperature, the amount of humidity can be increased even with the vaporizing humidifier.

(Embodiment 2)

Figure 3:
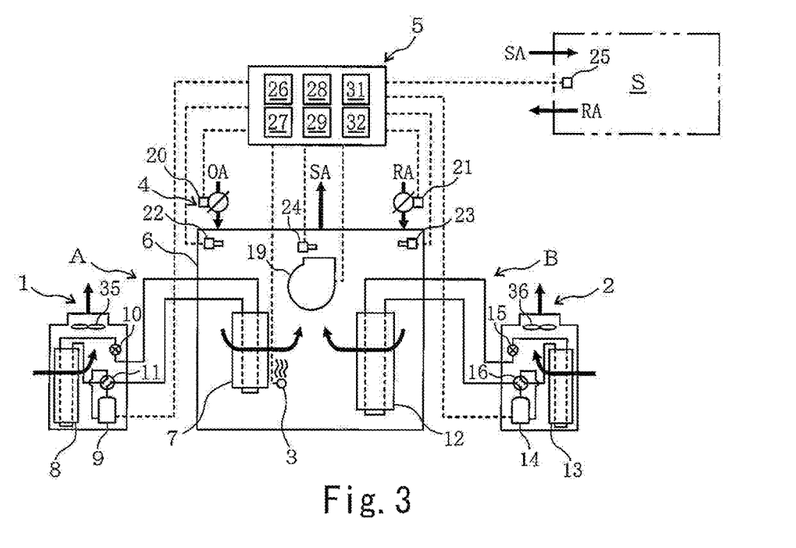
FIG. 3 shows one example of a schematic configuration of an air-source heat pump air conditioner according to Embodiment 2 of the present invention.

Next, the configuration of an air-source heat pump air conditioner according to Embodiment 2 of the present invention is described with reference to FIG. 3. FIG. 3 shows one example of a schematic configuration of the air-source heat pump air conditioner according to Embodiment 2 of the present invention.

As shown in FIG. 3, the air-source heat pump air conditioner according to Embodiment 2 is different in configuration from the air-source heat pump air conditioner according to Embodiment 1 shown in FIG. 1 in the following points: the humidifier 3 is configured as a steam humidifier that humidifies the air-conditioning air with steam at the downwind side of one of or both the first air-conditioning heat exchanger 7 and the second air-conditioning heat exchanger 12 (in the example shown in FIG. 3, only at the downwind side of the first air-conditioning heat exchanger 7); and the air conditioner control device 5 does not include the vaporization cooling controller 30. In the air-source heat pump air conditioner according to Embodiment 2, since the humidifier 3 is configured to humidify the air-conditioning air with steam, heating by steam humidification can be performed, for example, in an intermediate seasonal period. Since the other configurational features and operation examples of the air-source heat pump air conditioner according to Embodiment 2 are the same as those of the air-source heat pump air conditioner according to Embodiment 1 shown in FIG. 1, the description thereof is omitted.

(Embodiment 3)

Figure 4:
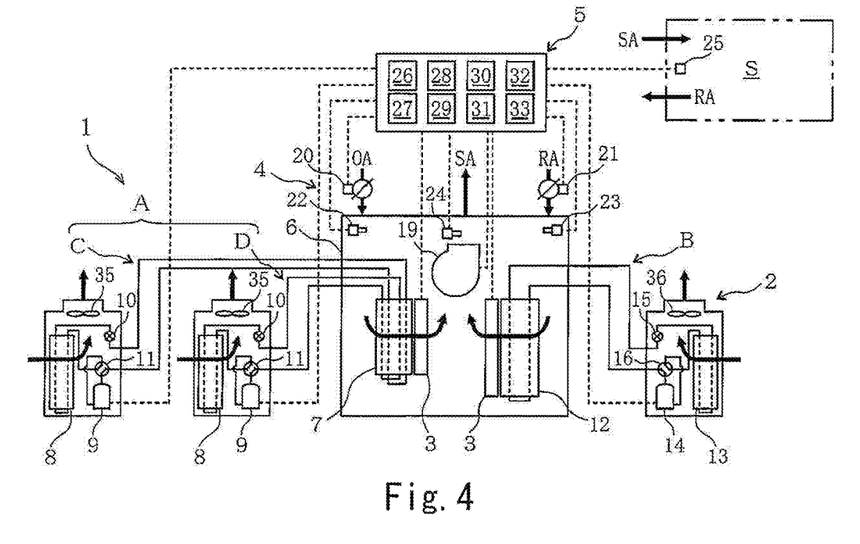
FIG. 4 is a schematic diagram showing one example of a schematic configuration of an air-source heat pump air conditioner according to Embodiment 3 of the present invention.

Next, the configuration of an air-source heat pump air conditioner according to Embodiment 3 of the present invention is described with reference to FIG. 4. FIG. 4 shows one example of a schematic configuration of the air-source heat pump air conditioner according to Embodiment 3 of the present invention.

As shown in FIG. 4, the air-source heat pump air conditioner according to Embodiment 3 is different in configuration from the air-source heat pump air conditioner according to Embodiment 1 shown in FIG. 1 in the following points. One of the differences is that the first heat pump 1 includes two sets of the first heat-source heat exchanger 8 and the first compressor 9. In the air-source heat pump air conditioner according to Embodiment 3, a third refrigeration cycle C is formed by a first set of the first heat-source heat exchanger 8 and the first compressor 9, the first air-conditioning heat exchanger 7, and a third circulating refrigerant flowing between and through these devices, and a fourth refrigeration cycle D is formed by a second set of the first heat-source heat exchanger 8 and the first compressor 9, the first air-conditioning heat exchanger 7, and a fourth circulating refrigerant flowing between and through these devices. That is, the first refrigeration cycle A is configured to include these two refrigeration cycles, i.e., the third refrigeration cycle C and the fourth refrigeration cycle D. Another difference from the configuration of the air-source heat pump air conditioner according to Embodiment 1 is that, in the air-source heat pump air conditioner according to Embodiment 3, the air conditioner control device 5 further includes a first air conditioning performance controller 33 configured to control the first heat pump 1 in accordance with variation in the load of the outside air to switch the operation state of the first heat pump 1 between a state where one of the third refrigeration cycle C and the fourth refrigeration cycle D is operated and a state where both the third refrigeration cycle C and the fourth refrigeration cycle D are operated. Since the other configurational features and operation examples of the air-source heat pump air conditioner according to Embodiment 3 are the same as those of the air-source heat pump air conditioner according to Embodiment 1 shown in FIG. 1, the description thereof is omitted. In the air-source heat pump air conditioner according to Embodiment 3, the humidifiers 3 may be configured as vaporizing humidifiers that humidify the air-conditioning air by utilizing evaporation of water as shown in FIG. 4, or may be configured as steam humidifiers as in the air-source heat pump air conditioner according to Embodiment 2 shown in FIG. 3.

(Embodiment 4)

Figure 5:
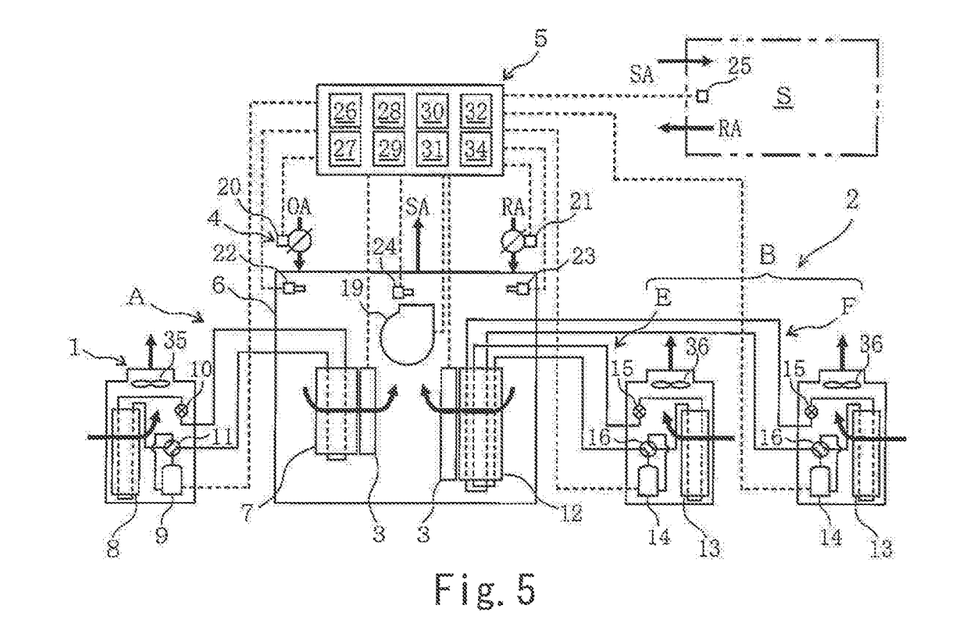
FIG. 5 is a schematic diagram showing one example of a schematic configuration of an air-source heat pump air conditioner according to Embodiment 4 of the present invention.

Next, the configuration of an air-source heat pump air conditioner according to Embodiment 4 of the present invention is described with reference to FIG. 5. FIG. 5 shows one example of a schematic configuration of the air-source heat pump air conditioner according to Embodiment 4 of the present invention.

As shown in FIG. 5, the air-source heat pump air conditioner according to Embodiment 4 is different in configuration from the air-source heat pump air conditioner according to Embodiment 1 shown in FIG. 1 in the following points. One of the differences is that the second heat pump 2 includes two sets of the second heat-source heat exchanger 13 and the second compressor 14. In the air-source heat pump air conditioner according to Embodiment 4, a fifth refrigeration cycle E is formed by a first set of the second heat-source heat exchanger 13 and the second compressor 14, the second air-conditioning heat exchanger 12, and a fifth circulating refrigerant flowing between and through these devices, and a sixth refrigeration cycle F is formed by a second set of the second heat-source heat exchanger 13 and the second compressor 14, the second air-conditioning heat exchanger 12, and a sixth circulating refrigerant flowing between and through these devices. That is, the second refrigeration cycle B is configured to include these two refrigeration cycles, i.e., the fifth refrigeration cycle E and the sixth refrigeration cycle F. Another difference from the configuration of the air-source heat pump air conditioner according to Embodiment 1 is that, in the air-source heat pump air conditioner according to Embodiment 4, the air conditioner control device 5 further includes a second air conditioning performance controller 34 configured to control the second heat pump 2 in accordance with variation in the load of the outside air to switch the operation state of the second heat pump 2 between a state where one of the fifth refrigeration cycle E and the sixth refrigeration cycle F is operated and a state where both the fifth refrigeration cycle E and the sixth refrigeration cycle F are operated. Since the other configurational features and operation examples of the air-source heat pump air conditioner according to Embodiment 4 are the same as those of the air-source heat pump air conditioner according to Embodiment 1 shown in FIG. 1, the description thereof is omitted. In the air-source heat pump air conditioner according to Embodiment 4, the humidifiers 3 may be configured as vaporizing humidifiers that humidify the air-conditioning air by utilizing evaporation of water as shown in FIG. 5, or may be configured as steam humidifiers as in the air-source heat pump air conditioner according to Embodiment 2 shown in FIG. 3.

It should be noted that the present invention is not limited to the above-described configurations of the air-source heat pump air conditioners according to Embodiments 1 to 4. For example, although not illustrated, the air-source heat pump air conditioner may adopt the following alternative configuration. Specifically, the first heat pump 1 includes the third refrigeration cycle C and the fourth refrigeration cycle D according to Embodiment 3 as shown in FIG. 4, and the second heat pump 2 includes the fifth refrigeration cycle E and the sixth refrigeration cycle F according to Embodiment 4 as shown in FIG. 5. Moreover, the air conditioner control device 5 may be configured to include the first air conditioning performance controller 33 according to Embodiment 3 shown in FIG. 4 and the second air conditioning performance controller 34 according to Embodiment 4 shown in FIG. 5. Furthermore, the air volume adjusting device 4 may be configured to include an air blower dedicated for adjusting the air volume of the outside air and an air blower dedicated for adjusting the air volume of the return air in place of the air blower 19, the first damper 20, and the second damper 21.

In a case where the air-source heat pump air conditioner is configured such that the humidifiers 3 are provided downwind of the first air-conditioning heat exchanger 7 and the second air-conditioning heat exchanger 12, respectively, one of the humidifiers 3 may be configured as a vaporizing humidifier, and the other humidifier 3 may be configured as a steam humidifier. Alternatively, each humidifier 3 may be configured to include both a vaporizing humidifier and a steam humidifier. For example, in the case of adopting such a configuration of the humidifier 3, the air-conditioning air may be first humidified by the vaporizing humidifier that consumes less energy, and if the humidification by the vaporizing humidifier alone is insufficient, the steam humidifier may be used at least for compensating for the insufficiency in the humidification. This makes it possible to realize both improvement in humidification precision and reduction of energy consumption.

The invention claimed is:

1. An air-source heat pump air conditioner comprising:
a first heat pump including a first refrigeration cycle that is formed by a first air-conditioning heat exchanger, a first heat-source heat exchanger, a first compressor, and a first circulating refrigerant flowing between and through the first air-conditioning heat exchanger, the first heat-source heat exchanger, and the first compressor;
a second heat pump including a second refrigeration cycle that is formed by a second air-conditioning heat exchanger, a second heat-source heat exchanger, a second compressor, and a second circulating refrigerant flowing between and through the second air-conditioning heat exchanger, the second heat-source heat exchanger, and the second compressor;
an air conditioner control device comprising a microprocessor, configured to control the first heat pump and the second heat pump to operate at least one of the first refrigeration cycle and the second refrigeration cycle to adjust air-conditioning air to be in a suitable air condition for air conditioning of a space to be air conditioned, the air-conditioning air containing outside air and return air that exchange heat with the first circulating refrigerant and the second circulating refrigerant in the first air-conditioning heat exchanger and the second air-conditioning heat exchanger; and
an air volume adjusting device configured to adjust an air volume of the outside air that exchanges heat with the first circulating refrigerant in the first air-conditioning heat exchanger and an air volume of the return air that exchanges heat with the second circulating refrigerant in the second air-conditioning heat exchanger, wherein
in a case where the air-conditioning air is adjustable to be in the suitable air condition by operating both the first refrigeration cycle and the second refrigeration cycle, the air conditioner control device:
controls the air volume adjusting device to increase the air volume of the return air and decrease the air volume of the outside air when the first heat pump has started a defrosting operation; and
controls the air volume adjusting device to decrease the air volume of the return air and increase the air volume of the outside air when the second heat pump has started a defrosting operation.

2. The air-source heat pump air conditioner according to claim 1, wherein
in a case where the air-conditioning air is adjustable to be in the suitable air condition by operating one of the first refrigeration cycle and the second refrigeration cycle, the air conditioner control device:
controls the first heat pump such that the outside air and the first circulating refrigerant exchange heat with each other in the first refrigeration cycle if a load of the outside air is greater than a preset load; and
controls the second heat pump such that the return air and the second circulating refrigerant exchange heat with each other in the second refrigeration cycle if the load of the outside air is less than the preset load.

3. The air-source heat pump air conditioner according to claim 2, further comprising an air volume adjusting device, including an air blower and at least one damper, configured to adjust an air volume of the outside air that exchanges heat with the first circulating refrigerant in the first air-conditioning heat exchanger and an air volume of the return air that exchanges heat with the second circulating refrigerant in the second air-conditioning heat exchanger, wherein
the air conditioner control device is configured to:
control the air volume adjusting device to increase the air volume of the return air and decrease the air volume of the outside air in a case where an enthalpy of the outside air is greater than an enthalpy of the return air; and control the air volume adjusting device to decrease the air volume of the return air and increase the air volume of the outside air in a case where the enthalpy of the outside air is less than the enthalpy of the return air.

4. The air-source heat pump air conditioner according to claim 2, wherein
the first heat pump includes two sets of the first heat-source heat exchanger and the first compressor,
the first refrigeration cycle includes:
  a third refrigeration cycle that is formed by a first set of the first heat-source heat exchanger and the first compressor, the first air-conditioning heat exchanger, and a third circulating refrigerant flowing between and through the first set of the first heat-source heat exchanger and the first compressor and the first air-conditioning heat exchanger; and
  a fourth refrigeration cycle that is formed by a second set of the first heat-source heat exchanger and the first compressor, the first air-conditioning heat exchanger, and a fourth circulating refrigerant flowing between and through the second set of the first heat-source heat exchanger and the first compressor and the first air-conditioning heat exchanger, and
the air conditioner control device is configured to control the first heat pump in accordance with variation in the load of the outside air to switch an operation state of the first heat pump between a state where one of the third refrigeration cycle and the fourth refrigeration cycle is operated and a state where both the third refrigeration cycle and the fourth refrigeration cycle are operated.

5. The air-source heat pump air conditioner according to claim 4, wherein
the second heat pump includes two sets of the second heat-source heat exchanger and the second compressor,
the second refrigeration cycle includes:
  a fifth refrigeration cycle that is formed by a first set of the second heat-source heat exchanger and the second compressor, the second air-conditioning heat exchanger, and a fifth circulating refrigerant flowing between and through the first set of the second heat-source heat exchanger and the second compressor and the second air-conditioning heat exchanger; and
  a sixth refrigeration cycle that is formed by a second set of the second heat-source heat exchanger and the second compressor, the second air-conditioning heat exchanger, and a sixth circulating refrigerant flowing between and through the second set of the second heat-source heat exchanger and the second compressor and the second air-conditioning heat exchanger, and
the air conditioner control device is configured to control the second heat pump in accordance with variation in the load of the outside air to switch an operation state of the second heat pump between a state where one of the fifth refrigeration cycle and the sixth refrigeration cycle is operated and a state where both the fifth refrigeration cycle and the sixth refrigeration cycle are operated.

6. The air-source heat pump air conditioner according to claim 2, wherein
the air conditioner control device is configured to cool the space to be air conditioned by the outside air in a case where a temperature of the outside air is lower than a temperature of the space to be air conditioned.

7. The air-source heat pump air conditioner according to claim 2, comprising a humidifier configured to humidify the air-conditioning air at a downwind side of one of or both the first air-conditioning heat exchanger and the second air-conditioning heat exchanger, wherein
the humidifier is configured as a vaporizing humidifier that humidifies the air-conditioning air by evaporation of water, or configured as a steam humidifier that humidifies the air-conditioning air with steam.

* * * * *